(12) United States Patent  (10) Patent No.: US 9,015,531 B2
De Angelis et al.  (45) Date of Patent: Apr. 21, 2015

(54) PREVENTING DISTRIBUTION OF A FAILURE

(71) Applicant: International Business Machines Corporation, Armonk, NY (US)

(72) Inventors: Fabio De Angelis, Rome (IT); Nicola Milanese, Rome (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 13/664,867

(22) Filed: Oct. 31, 2012

(65) Prior Publication Data

US 2013/0159793 A1  Jun. 20, 2013

(30) Foreign Application Priority Data

Dec. 14, 2011  (EP) .................................... 11193443

(51) Int. Cl.
*G06F 11/00*  (2006.01)
*G06F 11/07*  (2006.01)

(52) U.S. Cl.
CPC .................................. G06F 11/0793 (2013.01)

(58) Field of Classification Search
CPC ............................... G06F 8/68; G06F 11/0784
See application file for complete search history.

(56) References Cited

U.S. PATENT DOCUMENTS 7,398,272 B2 * 7/2008 Hindawi et al. ............... 709/203
8,055,617 B2 * 11/2011 Hindawi et al. ............... 707/613
2003/0065942 A1 4/2003 Lineman et al.
2004/0019835 A1 1/2004 Marisetty et al.
2005/0086534 A1 * 4/2005 Hindawi et al. ............... 713/201
2007/0180490 A1 8/2007 Renzi et al.
2008/0222296 A1 9/2008 Lippincott et al.
2008/0320006 A1 12/2008 Hindawi et al.
2011/0066841 A1 3/2011 Goodrow et al.
2011/0066951 A1 3/2011 Ward-Karet et al.
2012/0254675 A1 10/2012 Stepanenko et al.
2014/0089736 A1 * 3/2014 Okada ............................ 714/31

OTHER PUBLICATIONS

"BigFix Enterprise Suite Security Target", Version 1.0, BigFix, Inc., http://www.commoncriteriaportal.org/files/epfiles/st_vid10214-st.pdf, Dec. 16, 2008, 44 pages.

(Continued)

*Primary Examiner* — Christopher McCarthy
(74) *Attorney, Agent, or Firm* — Stephen J. Walder, Jr.; William J. Stock (57) ABSTRACT

Mechanisms for preventing a distribution of a failure caused by a sequence of instructions in a distributed client server environment are provided. These mechanisms comprise executing the sequence of instructions on a first client, the instructions being provided by a management control server and being indicative of maintenance actions. These mechanisms may further comprise determining by the first client a failure caused by the sequence of instructions, and generating a warning message by the first client based on the determined failure. The warning message may comprise an indicator for the sequence of instructions. In addition, these mechanisms may comprise sending the warning message for informing a second client about the sequence of instructions causing the failure in order to prevent a distribution of the failure.

16 Claims, 5 Drawing Sheets

(56) References Cited

OTHER PUBLICATIONS

"BigFix Enterprise Suite, Administrator's Guide", Version 8.0, BigFix, Inc., http://support.bigfix.com/product/documents/BES_Admin_Guide_80_100803.pdf, Jun. 23, 2010, 114 pages.

Buecker, Axel et al., "Flexible Policy Management for IT Security Services Using IBM Tivoli Security Policy Manager", An IBM Redpaper Publication (Source: IBM_REDBOOKS) Form No. REDP-4512-00, http://ip.com/redbook/REDP451200, published on Mar. 17, 2009, 32 pages.

Winkelbauer, Lynn et al., "Automated Provisioning using Tivoli Intelligent Orchestrator and Enterprise Workload Manager", An IBM Redpaper Publication (IBM_REDBOOKS) Form No. REPD-4117-01, http://ip.com/redbook/REDP411701, published on Jul. 8, 2007, 54 pages.

Combined Search and Examination Report under Sections 17 and 18(3) dated Jun. 12, 2013 for Application No. GB1221517.4, 5 pages.

"ITO Security Blog", ITO Security, http://itosecurity.com/blog/, Apr. 11, 2014, 4 pages.

Antman, Jason, "Patch Management: An Overview", Rutgers University, Dec. 10, 2008, pp. 1-18.

Crameri, Olivier et al., "Staged Deployment in Mirage, an Integrated Software Upgrade Testing and Distribution System", Proceedings of Twenty-first ACM SIGOPS Symposium on Operating Systems Principles (SOSP'07), Oct. 14-17, 2007, pp. 221-236.

\* cited by examiner

PREVENTING DISTRIBUTION OF A FAILURE

BACKGROUND

The invention relates generally to mechanisms for preventing a distribution of a failure and a preventing module. The invention relates further to an operating system, a computer system, a data processing program, and a computer program product.

In the field of distributed server client environments, systems management may be used for administration of distributed systems including (and commonly in practice) computer systems. The client-server model may be used for a distributed application that partitions tasks or workloads between providers of a resource or service, i.e. servers, and service requesters, i.e. clients. Often, clients and servers communicate over a computer network on separate hardware, but both client and server may reside in the same system.

Such systems may use a policy management, for example, as disclosed in U.S. Patent Application Publication No. 2007/0180490 A1. In this document, a system and method for providing policy-based protection services is disclosed. As a new threat is understood, one or more protection techniques are considered for protecting an asset. The organization assigns responsibilities to carry out or protect the asset and a policy is constructed. After the policy is developed, a plan is put into action to protect the asset, and a policy implementer is developed and/or purchased, distributed, configured, and managed. Finally, the policy, its enforcement, and its effectiveness, are reviewed to determine any changes needed, and new requirements are discovered, closing the lifecycle. An embodiment of the disclosure provides a method for sharing policy-based analysis, including: identifying at least one of a threat, a vulnerability, and a deficiency in a policy to produce a policy requirement; analyzing the policy requirement to produce at least one of a new policy element and revised policy element; and sharing the at least one of a new policy element and revised policy element.

Nowadays, the compliance of assets to specific policies is a critical aspect for many companies. Several products on the field deal with such issues by following several approaches either centrally orchestrated by a server or, using a policy approach where each agent will be in charge of ensuring compliance with a distributed policy.

One example of a policy-based architecture is the so-called BigFix® technology architecture formerly introduced by BigFix® Inc. Key components of the BigFix® service delivery platform include the BigFix® Agent, BigFix® Server and Console, BigFix® Fixlet messages, and BigFix® Relays. The BigFix® Platform creates a communication and management infrastructure for delivery of security and system management services to networked desktop, laptop/notebook and server computers. By assigning responsibility for reporting and management actions on endpoints themselves, the BigFix® platform may enable visibility and management of information technology (IT) infrastructures of a big amount of desktop, mobile and server computers. The BigFix® Agent resides on managed devices and acts as a universal policy engine capable of delivering multiple management services. A single BigFix® Agent can execute a diverse and extensible array of management services that range from real-time client status reporting, to patch and software distribution, to security policy enforcement.

The BigFix® architecture is used to keep computers in a desired state and to leverage the Fixlet concept. A Fixlet—in the remaining document being referred to as "fixlets"—is an object with a relevance statement and an associated action used to install software, updates and patches, as well as configuring computer properties. The relevance is evaluated on the clients in order to see whether or not the fixlet is applicable.

In a distributed environment, several fixlets may be enabled daily and sometimes in sequence. The installation sequence obviously may depend on specific external conditions that are mainly based on the reachability of each client in a specific timeframe or the dynamic population of specific logical groups. For that reason, it may happen that a particular installation sequence could cause a fault on a specific system that may depend on the specific installation sequence.

U.S. Patent Application Publication No. 2004/0019835 A1 discloses an operating system error handling mechanism. The described systems and methods may be utilized for single or multiple processor computer systems to handle errors in a coordinated manner between hardware and any firmware or software layers. A computer system includes a non-volatile memory and at least one processor. A firmware error handling routine is stored on the non-volatile memory. The firmware error handling routine is for handling errors. Each of the at least one processors detect errors. Each processor executes the firmware error handling routine on detecting an error. The executed firmware error handling routine handles the error. The executed firmware error handling routine also logs error information to a log. The systems and methods provide for coordinated error handling that enhance error recovery, provide error containment and maintain system availability.

However, when an error or fault occurs at one client caused by a sequence of instructions or fixlets, the same error may occur at further clients. This may lead to a propagation of the error when the same sequence of fixlets should be executed by a plurality of clients. Thus, there may be a need for an improved method of preventing distribution of errors caused by such instructions.

SUMMARY

This need for an improved method of preventing the distribution of errors mentioned above may be addressed by a method for preventing a distribution of an error, a preventing module, a computer system, an operating system, a data processing program, and a computer program product according to the independent claims.

In one embodiment, a method for preventing a distribution of a failure caused by a sequence of instructions in a distributed client server environment is provided. The method may comprise executing the sequence of instructions on a first client, the instructions being provided by a management control server and being indicative of maintenance actions. The method may further comprise determining, by the first client, a failure caused by the sequence of instructions and generating a warning message, by the first client, based on the determined failure. The warning message may comprise an indicator for the sequence of instructions. Additionally, the method may comprise sending the warning message for informing a second client about the sequence of instructions causing the failure in order to prevent a distribution of the failure.

In another embodiment, a preventing module for preventing a distribution of a failure caused by a sequence of instructions in a distributed client server environment is provided. The preventing module may comprise an execution unit being adapted to execute the sequence of instructions on a first client, the instructions being provided by a management control server and being indicative of maintenance actions. The preventing module may further comprise a determination unit being adapted to determine, by the first client, a failure caused by the sequence of instructions, and a generation unit being adapted to generate a warning message based on the determined failure. The warning message may comprise an indicator for the sequence of instructions. Furthermore, the preventing module may comprise a sending unit being adapted to send the warning message for informing a second client about the sequence of instructions causing the failure in order to prevent a distribution of the failure.

It may be noted that the sequence of instructions may refer to instructions or fixlets providing maintenance actions for a client. It may be further noted that actions specified within the instructions may be executed when a condition or relevance statement, which may also be specified within the instructions, is fulfilled.

BRIEF DESCRIPTION OF THE DRAWINGS

Preferred embodiments of the invention will now be described, by way of example only and with reference to the following drawings.

DETAILED DESCRIPTION

In the context of this application, the following conventions have been followed:

Distributed client server environment—The distributed client server environment may denote a network of clients and server computers executing a client-server application that allows monitoring and management of targeted information technology (IT) systems from a central location. The application may utilize a Fixlet® technology to identify, for instance, misconfigured computers in the environment, and may allow authorized users to remediate identified issues across the network.

Client—Client may denote a computer within the distributed client server environment or may denote an application installed on computers (personal computer, server, workstation, desktop, laptop, etc.) within the environment that may be managed by the client-server application. Clients may be also be referred to as agents, and both these terms may be interchangeable. Clients may access a collection of so-called fixlet messages that may be able to detect security holes, vulnerabilities, and other configuration issues and action messages capable of implementing corrective actions received from a management control server. In most cases, the client may operate silently in the background, so that users may not be aware of what actions may take place on their system. In one embodiment, the clients may listen on a (UDP=User datagram Protocol) port for messages from the server indicating that updated data may be available for retrieval. The clients may use, for instance, HTTP to connect to servers in order to retrieve fixlets and to send results of applying fixlets back to a server.

Management control server—The management control server may be, for instance, a so-called BigFix® Server providing a control center and repository for managed system configuration data, software updates and patches, and other management information. For instance, the management control server may provide instructions to the clients for performing any kind of maintenance actions.

Instructions—Instructions in this context may refer to Big-Fix® fixlet messages being instructions to the clients to perform a management or reporting action. Fixlet messages may be programmed to target specific groups of devices to perform management actions. In other words, a fixlet may be a mechanism for targeting and describing a problematic situation on a computer and providing an automatic fix for it. A fixlet message or instruction may comprise a condition (or relevance statement) and an action, wherein the action of the instruction may be executed if the condition is fulfilled. As used in the following, a sequence of instructions may denote at least two instructions or fixlet messages to be executed.

Maintenance actions—Maintenance actions may define a change applied to a system in order to remediate issues identified by fixlets. A fixlet that detects an issue may offer several different remediation actions. For example, a fixlet may detect a missing Microsoft Windows® operating system Service Pack and offer an action to download and install it on the relevant systems. "Windows" denotes an operating system from Microsoft Inc.

Failure—A failure in this context may be any kind of malfunction or error occurring in the client.

Warning message—A warning message may be any kind of signal providing a warning message. The warning message may comprise information about the sequence of instructions causing a failure. The information may be either the sequence of instructions or may be an indicator for the sequence of instructions, for example, a number.

The above-described method for preventing a failure distribution may offer a couple of advantages. In particular, it may allow the distributed system to avoid proliferation or distribution of failures triggered by the same root cause, i.e., by a specific sequence of instructions. In this way, when a specific sequence causes an error or failure, in particular, on a specific hardware being associated with a client, the installation history may be used as a warning to be leveraged to inform other clients. So, when a client faces a problem on a specific fixlet (i.e., a sequence of instructions), based on the specific configuration, it may inform further client(s) about the issue. The method may be implemented leveraging the current BigFix® architecture and providing the additional capability to propagate the information failures in order to build a new dynamic applicability condition.

Using the described method may avoid the propagation of errors inside a group of computers or machines that may remain in a problematic state for a long time before the installation problem is fixed.

In one embodiment of the method, sending the warning message may comprise sending the warning message to the management control server and forwarding the warning message by the management control server to at least the second client.

The method may be based on a server centric approach, where an administrator may define and send to each client, a list of clients that it will notify in case of an error, or allow each client to define a trusted clients group. In one embodiment, once a fixlet on the first client fails to install or causes a failure, the sequence of the last x fixlets (where x is a value that may be either manually or statistically configured) installed may be sent to one or more clients. This may be performed via the server, wherein the first client may send the warning message to the server and the server may inform the second and eventually further clients. Or it may be performed directly, wherein the first client sends the warning message directly to the second client and eventually further clients, based, for instance, on a defined list as described above. The first client may inform the server and/or the peer clients about the failure. The server may process all the received sequences in search of patterns and marking all the computers that may fail in the future based on the determined sequence of instructions. The computers may be, for example, marked with a new applicability of the fixlets in view of a warning state.

In a further embodiment, the method may further comprise receiving the warning message by the second client, and performing an action based on the warning message. The second client may perform any actions like deleting the sequence of instructions or deleting the warning message.

In a further embodiment, performing an action may comprise determining by the second client whether the second client may have received the same sequence of instructions. The second client may check if the sequence received from the first client, directly or indirectly via the server, may be equal to the sequence of fixlets stored on the local system. "Stored on the system" may denote that the client may have received and stored the list or sequence of instructions. The sequence of instructions or fixlets may have been already executed or not executed.

In a further embodiment, the method may additionally comprise, if the second client received a further sequence of instructions different from the sequence of instructions causing the failure, deleting the warning message. If the list or sequence is different, the information, i.e., the warning message, may be deleted as it is not applicable in this case.

In again another embodiment, the method may also comprise, if the second client has received a further sequence of instructions identical to the sequence of instructions causing the failure, and if the second client has not executed the further sequence of instructions, deleting the further sequence of instructions.

If the lists or sequences are equal to each other, but the client may not have executed the instructions or fixlets, which may cause the error or failure, the installation or execution of the instructions might be stopped or cancelled. In one embodiment, the sequence of instructions or fixlets may have been marked already on the server as "applicable with warning", so that the second client may be informed about the possible failure before retrieving and storing the sequence of instructions, and thus effectively preventing a distribution of failures.

In a preferred embodiment, the method may also comprise, if the second client has received a further sequence of instructions identical to the sequence of instructions causing the failure, and if the second client has executed the further sequence of instructions, determining whether a failure has been caused by the further sequence of instructions. It may be the case that the sequence of instructions has caused a failure or not. Depending on this, the second client may perform any corrective action.

In one embodiment, the method may additionally comprise, if a failure is determined to have occurred, generating a further warning message based on the determined failure, and sending the warning message for informing a further client about the sequence of instructions causing the failure in order to prevent a distribution of the failure. If no error is determined, the method may further comprise generating a message comprising information of the further sequence of instructions and sending the message for informing a further client to delete the warning message and to execute the sequence of instructions.

In the case that the sequence of instructions or fixlets was already installed successfully by the second client, then the client may notify further clients to discard the information from the first client since the installation failure may not have been caused by the sequence itself, but by some other event, for instance a hardware problem of the first client. The installation may therefore be safely executed by further clients.

Additionally, the second client may also send a warning message in the case that the sequence of instructions may have also caused a failure for the second client.

Furthermore, an operating system may be configured to execute the method according to the illustrative embodiments as explained above. Such integration into an operating system may have the advantage that the method for preventing failure distribution may be performed immediately as a new function of the operating system just after an installation. No new additional operating system programs may need to be installed on the computer for preventing a distribution of errors caused by maintenance instructions.

It should be noted that embodiments may take the form of an entirely hardware implementation, an entirely software embodiment, or an embodiment containing both hardware and software elements. In a preferred embodiment, the invention may be implemented in software, which includes, but is not limited to, firmware, resident software and/or microcode.

In another embodiment, a data processing program for execution in a data processing system may be provided comprising software code portions for performing the method, as described above, when the program may be run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be provided. All illustrations in the figures are schematic. Firstly, a block diagram of an embodiment of the method for preventing a failure distribution will be described. Afterwards, embodiments of the method and the preventing module will be described.

Figure 1:
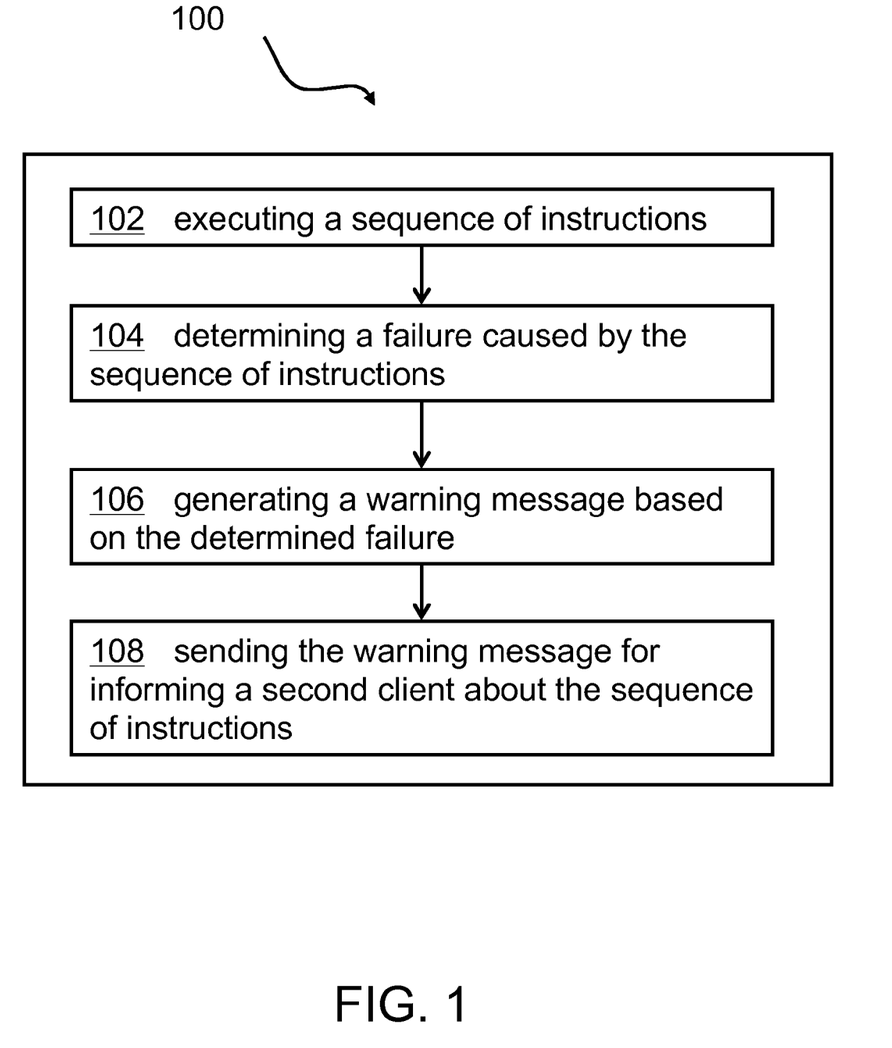
FIG. 1 shows an example block diagram of one illustrative embodiment of the inventive method for preventing a failure distribution.

FIG. 1 shows a block diagram of an embodiment of the inventive method 100 for preventing distribution of a failure. The failure may be caused by a sequence of instructions (fixlets). The method may apply to a distributed client server environment. The method may comprise, executing, 102, the sequence of instructions on a first client. The instructions may be provided by a management control server and may be indicative of maintenance actions. An instruction may comprise information referring to a maintenance action which should be carried out on the first client. The method may further comprise determining, 104, by the first client a failure caused by the sequence of instructions and generating, 106, a warning message by the first client based on the determined failure. The warning message may comprise an indicator for the sequence of instructions. The indicator may also be the complete sequence of instructions. The method may further comprise sending, 108, the warning message for informing a second client about the sequence of instructions causing the failure in order to prevent a distribution of the failure.

Figure 2:
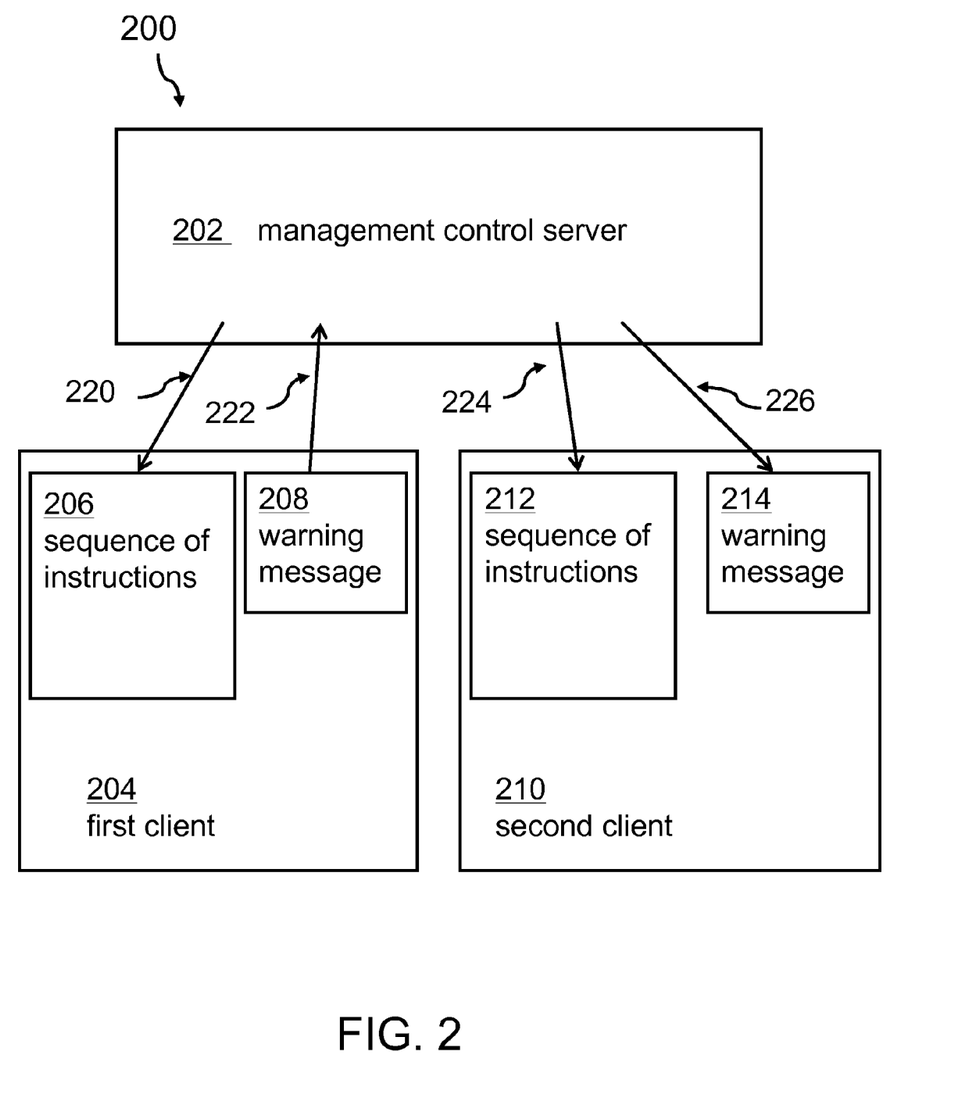
FIG. 2 shows an example block diagram of a distributed server client network in which aspects of the illustrative embodiments may be implemented.

FIG. 2 shows a block diagram 200 of a distributed client server network. The network may comprise a management control server 202. The management control server may provide different instructions, so-called fixlets as described above. A first client 204 may receive, 220, a sequence of instructions 206 from the management control server.

When executing the sequence of instructions, the first client may determine a failure caused by the sequence of instructions. The failure may be any malfunction occurring within the first client. Based on the failure, the first client may generate a warning message 208. The warning message may comprise an indicator for the sequence of instructions, such as the whole sequence or a number for each instruction of the sequence of instructions. The warning message may comprise an indicator of the sequence of instructions causing a failure. The indicator for the sequence of instructions may be based on an instruction history. How many instructions may be included in the reported sequence can be defined by a configuration of the client, or may be calculated based on historical data, or may alternatively be profiled to the specific recipient. A specific client may require, for instance, the last three instructions, wherein another client may require the last five instructions. Then, the first client 204 may send, 222, the warning message to the management control server.

The management control server may send, 226, the warning message to a second client 210, for informing the second client about the sequence of instructions causing the failure. The second client may have received, 224, already a further sequence of instructions 212 from the management control server. Based on the further sequence of instructions 212 and the warning message 214, the second client may decide how to proceed further, as described in FIG. 3.

Additional clients may be informed. The list of clients to be alerted may be created according to multiple factors like operating system or software configurations on the clients. For example, in a specific company, all developer clients may be in a list of clients to be alerted since they may be similar or identical in terms of a used software stack. Such factors may also include any other useful criteria like geographical or topological criteria.

Figure 3:
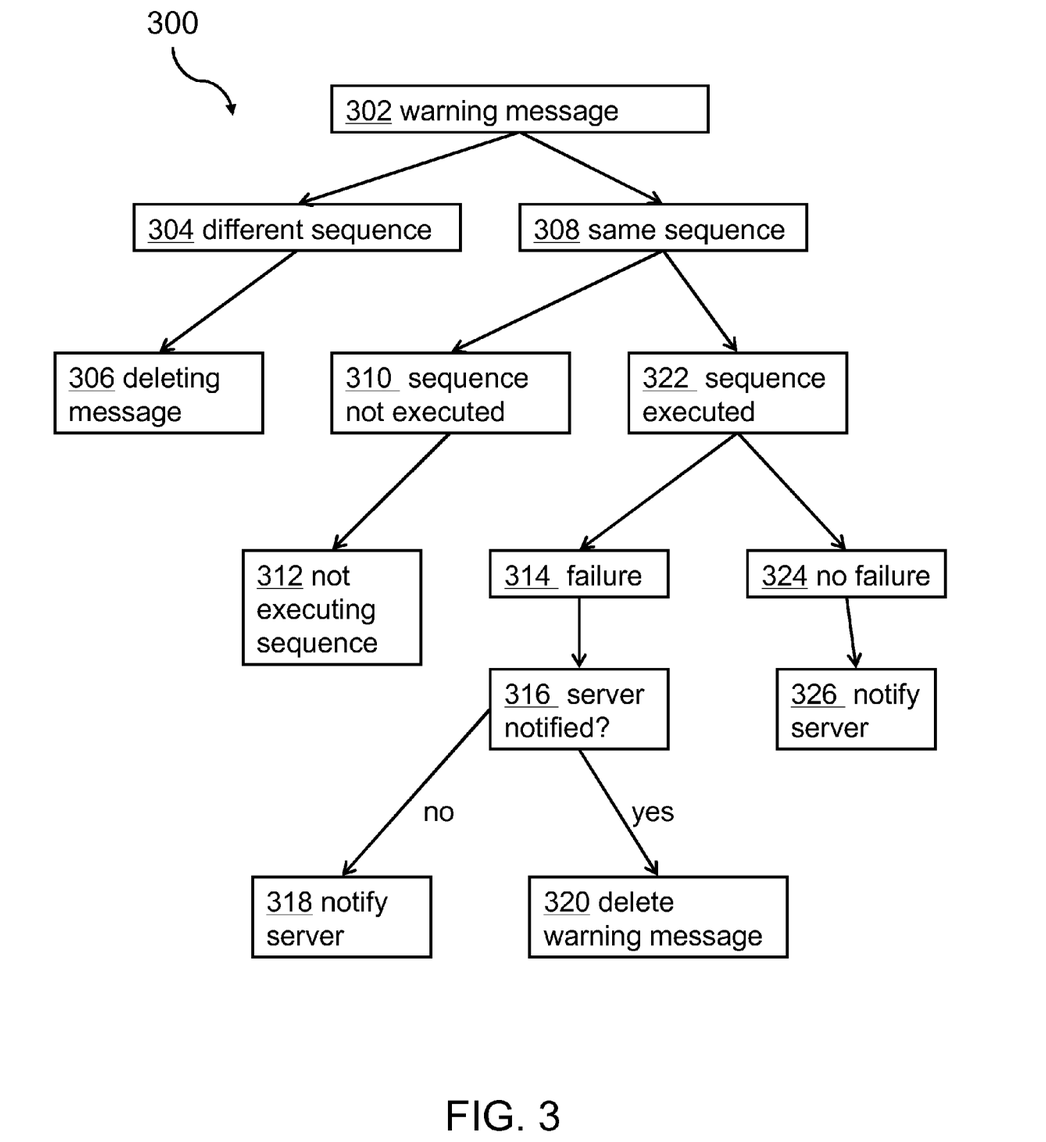
FIG. 3 shows an example graphical representation of one illustrative embodiment of the inventive method for preventing a failure distribution.

FIG. 3 shows a graphical representation 300 of one embodiment of the method for preventing a failure distribution. If a failure occurs on the first client, a warning message may be sent to the second client, 302. The second client, and eventually also further clients, may check if the sequence received from the first client may be equal to a sequence of instructions installed on the local system of the second or the further clients, 304, 308. If the list is different, 304, the information, i.e. the warning message, may be deleted, 306, as there should be no failure based on the sequence of instructions executed by the first client.

If the list or sequence is equal, 308, then it is determined whether this sequence has been executed already by the second client, 310, 322. In the case that the sequence of instructions has been executed, 322, with success, i.e. without failure, 324, by the second client, then this client may notify the server, 326, and thus, also all other clients, to discard the information from the first client since the installation failure was not caused by the sequence but by some other event. The notified clients can then execute this sequence of instructions.

In the case that the sequence of instructions has been executed, 322, and a failure has occurred, 314, the second client may determine whether the server has already been notified, 316. If not, the second client may notify the server and confirm that a failure has occurred, 318. In this case, the second client may delete the warning message, 320.

In the case that the sequence of instructions have been received already but not yet executed, 310, the installation may be prevented, 312, and only executed once the administrator enables the instruction again. The instruction or fixlet may be marked "applicable with warning". This marking may be removed once it has been detected that there was an execution of the instruction or fixlet and there was no failure.

Figure 4:
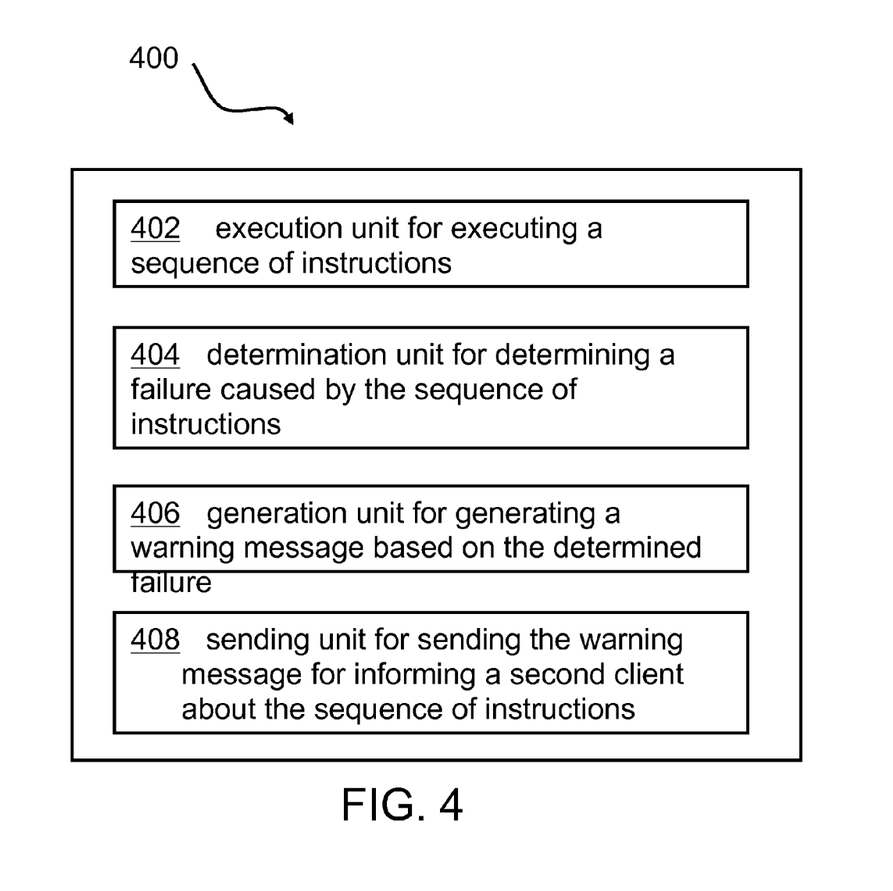
FIG. 4 shows an example block diagram of one illustrative embodiment of the preventing module.

FIG. 4 shows a block diagram 400 of an embodiment of the preventing module for preventing a distribution of a failure caused by a sequence of instructions in a distributed client server environment. The preventing module 400 may comprise an execution unit 402. The execution unit 402 may be adapted to execute the sequence of instructions on a first client. The instructions may be received from a management control server (such as management control server 202 in FIG. 2) and may be indicative of maintenance actions to be performed by the first client (such as first client 204 in FIG. 2).

The preventing module 400 may further comprise a determination unit 404. The determination unit 404 may be adapted to determine a failure caused by the sequence of instructions. Furthermore, the preventing module 400 may comprise a generation unit 406 being adapted to generate a warning message based on the determined failure. The warning message may comprise an indicator for the sequence of instructions causing the failure.

In addition, the preventing module 400 may comprise a sending unit 408 being adapted to send the warning message for informing a second client (such as second client 210 in FIG. 2) about the sequence of instructions causing the failure in order to prevent a distribution of the failure. By informing the second client or more clients about the possibility that the sequence of instructions causes a failure, the other clients may stop installing or executing the sequence of instructions.

Thus, the failure may be prevented from being distributed among a plurality of clients within the distributed client server environment.

Such a preventing module 400 may be implemented in a computer system. This way, the preventing module 400 of the computer system may work in cooperation with an operating system for performing the method for preventing a distribution of a failure as described above.

Figure 5:
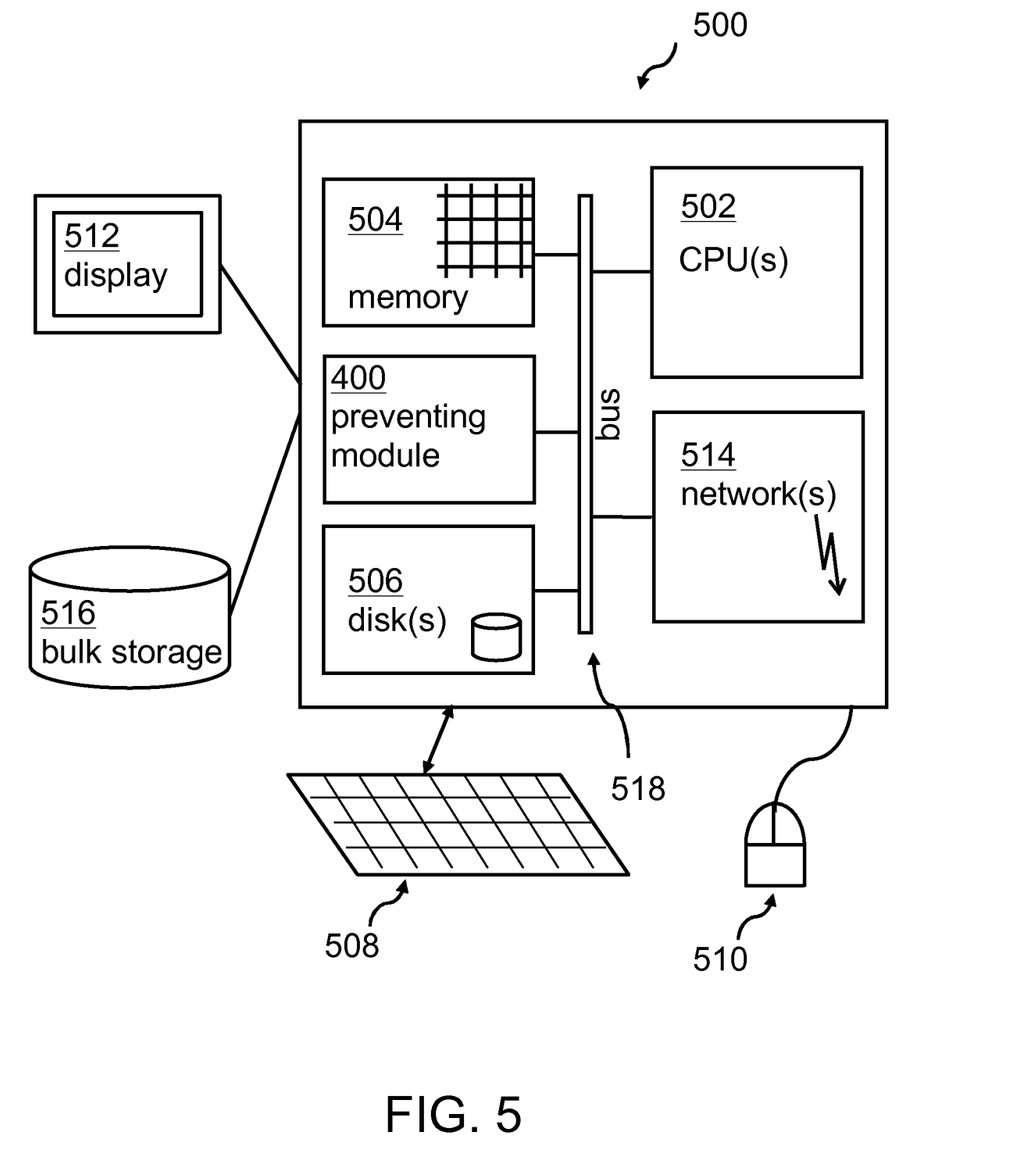
FIG. 5 displays an example of a computer system including the inventive preventing module in accordance with one illustrative embodiment.

Embodiments of the invention may be implemented on virtually any type of computer, regardless of the platform being suitable for storing and/or executing program code. For example, as shown in FIG. 5, a computer system 500 may include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities, typical of today's computers (not shown). The memory elements 504 may include a main memory, e.g., a random access memory (RAM), employed during actual execution of the program code, and a cache memory, which provides temporary storage of at least some program code and/or data in order to reduce the number of times, code and/or data must be retrieved from a long term storage medium or external bulk storage 516 for an execution. Elements inside the computer 500 may be linked together by means of a bus system 518 with corresponding adapters. Additionally, the preventing module 400 may be attached to the bus system 518.

The computer system 500 may also include input means, such as a keyboard 508, a pointing device such as a mouse 510, or a microphone (not shown). Furthermore, the computer 500, may include output means, such as a monitor or screen 512 [e.g., a liquid crystal display (LCD), a plasma display, a light emitting diode display (LED), or cathode ray tube (CRT) monitor]. The computer system 500 may be connected to a network (e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention.

Further, those skilled in the art will appreciate that one or more elements of the aforementioned computer system 500 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

The invention claimed is:

1. A method for preventing a distribution of a failure caused by a sequence of instructions in a distributed client server environment, the method comprising:
   executing the sequence of instructions on a first client computing device, the instructions being provided by a management control server and being indicative of maintenance actions;
   determining, by the first client computing device, a failure caused by the sequence of instructions;
   generating, by the first client computing device, a warning message based on the determined failure, the warning message comprising an indicator for the sequence of instructions; and
   sending the warning message to a second client computing device to inform the second client computing device about the sequence of instructions causing the failure in order to prevent a distribution of the failure, wherein sending the warning message comprises sending the warning message to the management control server, and wherein the management control server forwards the warning message to at least the second client computing device.

2. The method according to claim 1, further comprising:
   receiving the warning message by the second client computing device; and
   performing an action based on the warning message.

3. The method according to claim 2, wherein performing an action comprises:
   determining, by the second client computing device, whether the second client computing device has received the same sequence of instructions.

4. The method according to claim 3, further comprising:
   in response to the second client computing device having received a further sequence of instructions different than the sequence of instructions causing the failure, deleting the warning message.

5. The method according to claim 3, further comprising:
   in response to the second client computing device having received a further sequence of instructions identical to the sequence of instructions causing the failure, and the second client computing device not having executed the further sequence of instructions, deleting the further sequence of instructions.

6. The method according to claim 3, further comprising:
   in response to the second client computing device having received a further sequence of instructions identical to the sequence of instructions causing the failure and the second client computing device having executed the further sequence of instructions, determining whether a second failure on the second client computing device, was caused by execution of the further sequence of instructions.

7. The method according to claim 6, further comprising at least one of:
   in response to the second failure on the second client computing device being determined to have been caused by the execution of the further sequence of instructions, generating a further warning message based on the determined second failure, and sending the warning message for informing a further client computing device about the sequence of instructions causing the second failure in order to prevent a distribution of the second failure; or in response to no second failure being determined, generating a message comprising information of the further sequence of instructions, and sending the message to the further client to inform the further client computing device to delete the warning message and to execute the sequence of instructions.

8. A preventing module for preventing a distribution of a failure caused by a sequence of instructions in a distributed client server environment, the preventing module comprising:

an execution unit being adapted to execute the sequence of instructions on a first client computing device, the instructions being provided by a management control server and being indicative of maintenance actions;

a determination unit being adapted to determine by the first client computing device a failure caused by the sequence of instructions;

a generation unit being adapted to generate a warning message based on the determined failure, the warning message comprising an indicator for the sequence of instructions; and a sending unit being adapted to send the warning message to a second client computing device to inform the second client computing device about the sequence of instructions causing the failure in order to prevent a distribution of the failure, wherein sending the warning message comprises sending the warning message to the management control server, and wherein the management control server forwards the warning message to at least the second client computing device.

9. A data processing system comprising:
a processor coupled to a memory;
a preventing module coupled to the processor; and
a network interface coupled to the preventing module, wherein the processor executes a sequence of instructions loaded into the memory, and wherein the preventing module is configured to:
detect a failure that is caused by the execution of the sequence of instructions;
generate a warning message based on the detected failure, the warning message comprising an indicator of the sequence of instructions; and
send, via the network interface, the warning message to a second data processing system to inform the second data processing system about the sequence of instructions causing the failure in order to prevent a distribution of the failure, wherein sending the warning message comprises sending the warning message to a management control server, and wherein the management control server forwards the warning message to at least the second data processing system.

10. A computer program product comprising a non-transitory computer readable medium having a computer readable program stored therein, wherein the computer readable program, when executed on a data processing system, causes the data processing system to:
execute a sequence of instructions;
detect a failure that is caused by the execution of the sequence of instructions;
generate a warning message based on the detected failure, the warning message comprising an indicator of the sequence of instructions; and
send the warning message to a second data processing system to inform the second data processing system about the sequence of instructions causing the failure in order to prevent a distribution of the failure, wherein sending the warning message comprises sending the warning message to a management control server, and wherein the management control server forwards the warning message to at least the second data processing system.

11. A method, in a data processing system, for preventing a distribution of a failure caused by a sequence of instructions in a distributed client server environment, the method comprising:

executing, by the data processing system, the sequence of instructions;

detecting, by the data processing system, a failure that is caused by the execution of the sequence of instructions;

generating, by the data processing system, a warning message based on the detected failure, the warning message comprising an indicator of the sequence of instructions; and sending, by the data processing system, the warning message to a second data processing system to inform the second data processing system about the sequence of instructions causing the failure in order to prevent a distribution of the failure, wherein the sequence of instructions is a fixlet.

12. The method according to claim 11, wherein the second data processing system is a management control server that forwards the warning message to one or more third data processing systems.

13. The method of claim 11, further comprising instructing the second data processing system to perform an action, based on the warning message, to determine whether the second data processing system has received a same sequence of instructions and determine whether the second data processing system has executed the same sequence of instructions.

14. The method of claim 13, wherein, in response to the second data processing system having received a same sequence of instructions, and the second data processing system not having executed the same sequence of instructions, instructing the second data processing system to delete the same sequence of instructions from the second data processing system.

15. The method of claim 13, wherein, in response to the second data processing system having received a same sequence of instructions and the second data processing system having executed the same sequence of instructions, the second data processing system determines whether the second data processing system detected a second failure due to an execution of the same sequence of instructions.

16. The method of claim 15, further comprising at least one of:

in response to the second failure on the second data processing system being determined to have been caused by the execution of the same sequence of instructions, generating a further warning message based on the determined second failure, and sending the further warning message to a third data processing system indicating the sequence of instructions being a cause of the second failure in order to prevent a distribution of the second failure; or in response to no second failure being determined, generating a message comprising information of the sequence of instructions, and sending the message to the third data processing system to inform the third data processing system to delete the warning message and to execute the sequence of instructions.

* * * * *